United States Patent
Lee et al.

(10) Patent No.: US 10,462,501 B2
(45) Date of Patent: Oct. 29, 2019

(54) METHOD AND APPARATUS FOR INSTALLING CONDITIONAL ACCESS SYSTEM INFORMATION

(71) Applicant: Samsung Electronics Co., Ltd., Suwon-si, Gyeonggi-do (KR)

(72) Inventors: Hyejin Lee, Seoul (KR); Myungjin Eom, Seoul (KR); Heejeong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/675,553

(22) Filed: Aug. 11, 2017

(65) Prior Publication Data
US 2018/0048919 A1     Feb. 15, 2018

(30) Foreign Application Priority Data
Aug. 11, 2016   (KR) .................. 10-2016-0102424

(51) Int. Cl.
| | | |
|---|---|---|
| H04N 21/2347 | (2011.01) | |
| H04L 29/06 | (2006.01) | |
| H04N 21/266 | (2011.01) | |
| H04N 21/45 | (2011.01) | |
| H04N 21/4405 | (2011.01) | |

(52) U.S. Cl.
CPC ..... *H04N 21/2347* (2013.01); *H04L 63/0442* (2013.01); *H04L 63/062* (2013.01); *H04L 63/08* (2013.01); *H04L 63/10* (2013.01); *H04L 63/123* (2013.01); *H04N 21/266* (2013.01); *H04N 21/4405* (2013.01); *H04N 21/4524* (2013.01); *H04J 2203/008* (2013.01); *H04L 2463/101* (2013.01)

(58) Field of Classification Search
None
See application file for complete search history.

(56) References Cited

U.S. PATENT DOCUMENTS 9,591,339 B1 *   3/2017   Christie ............. H04N 21/2541
9,774,917 B1 *   9/2017   Christie ............. H04N 21/4823
(Continued)

FOREIGN PATENT DOCUMENTS

| WO | 2009057857 A1 | 5/2009 |
|---|---|---|
| WO | 2012/141501 A2 | 10/2012 |
| WO | 2012141501 A2 | 10/2012 |

OTHER PUBLICATIONS

International Search Report dated Nov. 23, 2017 in connection with International Patent Application No. PCT/KR2017/008677.
(Continued)

*Primary Examiner* — Hoang Vu A Nguyen Ba

(57) ABSTRACT

Various exemplary embodiments of the present disclosure relate to method and an apparatus a broadcast receiver for a conditional access system (CAS) information download. The CAS information download method includes acquiring broadcast provider information. The method also includes, selecting a broadcast provider based on the broadcast provider information. The method further includes, transmitting a subscription request including identity information of the broadcast reception device to a broadcast provider server of the selected broadcast provider. The method also includes, downloading CAS information from a CAS server.

20 Claims, 15 Drawing Sheets

(56) References Cited

U.S. PATENT DOCUMENTS

| | | | |
|---|---|---|---|
| 2005/0198317 A1* | 9/2005 | Byers | H04H 20/38 709/228 |
| 2006/0015461 A1 | 1/2006 | Kang | |
| 2006/0224775 A1* | 10/2006 | Lee | H04L 63/062 709/248 |
| 2008/0288784 A1 | 11/2008 | Lee et al. | |
| 2009/0125710 A1 | 5/2009 | Park et al. | |
| 2009/0141901 A1 | 6/2009 | You et al. | |
| 2010/0161966 A1* | 6/2010 | Kwon | H04L 9/3273 713/155 |
| 2010/0235624 A1* | 9/2010 | Candelore | H04N 7/163 713/155 |
| 2010/0313014 A1* | 12/2010 | Medvinsky | G06F 21/10 713/158 |
| 2011/0113465 A1 | 5/2011 | Joe et al. | |
| 2011/0131413 A1* | 6/2011 | Moon | H04N 7/1675 713/168 |
| 2012/0054679 A1* | 3/2012 | Ma | H04N 21/4532 715/810 |
| 2013/0046982 A1* | 2/2013 | Suh | G06F 9/5072 713/171 |
| 2013/0091516 A1 | 4/2013 | Swix et al. | |
| 2013/0156187 A1 | 6/2013 | Huh et al. | |
| 2013/0185748 A1 | 7/2013 | Kim et al. | |
| 2013/0298253 A1 | 11/2013 | Hwang et al. | |
| 2014/0090005 A1* | 3/2014 | Fujisawa | H04H 20/93 725/131 |
| 2014/0094153 A1 | 4/2014 | Barbulescu et al. | |
| 2014/0157304 A1* | 6/2014 | Fay | H04N 21/2385 725/32 |
| 2015/0071440 A1* | 3/2015 | Raghupathy | G06F 21/6245 380/258 |
| 2017/0105035 A1* | 4/2017 | Penugonda | H04N 21/26606 |
| 2017/0272700 A1* | 9/2017 | Kahn | H04N 7/162 |

OTHER PUBLICATIONS

Supplementary European Search Report dated Mar. 28, 2019 in connection with European Patent Application No. 17 83 9825, 13 pages.
DVB Organization, "CM-SEC1114r2 use cases for CA neutral CPE.doc", Digital Video Broadcasting, Sep. 21, 2006, 24 pages.

* cited by examiner

METHOD AND APPARATUS FOR INSTALLING CONDITIONAL ACCESS SYSTEM INFORMATION

PRIORITY

The present application is related to and claims the benefit under 35 U.S.C. § 119(a) to Korean Patent Application No. 10-2016-0102424, filed on Aug. 11, 2016, the entire disclosure of which is hereby incorporated by reference.

TECHNICAL FIELD

The present invention relates to a conditional access system (CAS) installation method and apparatus. In particular, the present invention relates to a CAS information download method and apparatus of a broadcast receiver.

BACKGROUND

Analog television (TV) broadcasting is being replaced by digital TV broadcasting. In order to receive digital broadcast signals, a set-top box is required. The set-top box is designed to receive various digital broadcast channels. The set-top box has CAS information including information on the channels subscribed by a subscriber. The broadcast service provider provides the subscriber with the broadcast service based on the subscription information.

The CAS is a restrictive access system for restricting unauthorized users from accessing the channels or services. The CAS allows only authorized subscribers to descramble the scrambled signals broadcast by the broadcasting company and watch the broadcast. The basic requirements for implementing such a system are program and data scrambling for ensuring security of the communication links and subscriber authentication and access control functions.

FIG. 1 is a block diagram illustrating an exemplary set-top box-based broadcast reception system, according to an embodiment of the present disclosure. In reference to FIG. 1, the broadcast reception system includes a broadcast provider server 110, a set-top box 120, and a TV 130. The TV 130 is connected to the set-top box 120. If a CAS card 125 is inserted into the set-top box 120, then the set-top box 120 decrypts the encrypted signals with the CAS information stored in the CAS card 125. The decrypted signals are modulated into radio frequency (RF) signals and transferred to the TV 130 for viewing by the subscriber.

FIG. 2 is a block diagram illustrating another exemplary set-top box-based broadcast reception system, according to an embodiment of the present disclosure. In reference to FIG. 2, the broadcast reception system includes a broadcast provider server 210, a first set-top box 220, a second set-top box 230, a first TV 240, and a second TV 250. The first TV 240 is connected to the first set-top box 220, and the second TV 250 is connected to the second set-top box 230. Each of the first and second TVs 240 and 250 should be connected to a set-top box to receive digital broadcast signals. The set-top boxes 220 and 230 have CAS cards 225 and 235 respectively inserted therein and decrypt the encrypted signals with the CAS information stored in the respective CAS cards 225 and 235; the decrypted signals are modulated into RF signals and transferred to the first and second TVs 240 and 250 for viewing by the subscriber(s).

As described above, in order to receive digital broadcast signals, a TV should be connected to a set-top box having a physical CAS card inserted therein. However, the legacy set-top box-based broadcast reception systems have drawbacks as they require extra devices in addition to a TV for use of CAS information in receiving broadcast signals and laborious installation processes thereof, resulting in user inconvenience.

SUMMARY

To address the above-discussed deficiencies, it is a primary object to provide a conditional access system (CAS) information download method and apparatus. Also, the present invention aims to provide a CAS information download method and apparatus of a broadcast reception device.

In accordance with an aspect of the present invention, a CAS information download method of a broadcast reception device is provided. The CAS information download method includes acquiring broadcast provider information, selecting a broadcast provider based on the broadcast provider information, transmitting a subscription request including identity information of the broadcast reception device to a broadcast provider server of the selected broadcast provider, and downloading CAS information from a CAS server.

In accordance with another aspect of the present invention, a broadcast reception device is provided. The broadcast reception device includes a controller which controls acquiring broadcast provider information, selecting a broadcast provider based on the broadcast provider information, transmitting a subscription request including identity information of the broadcast reception device to a broadcast provider server of the selected broadcast provider, and downloading CAS information from a CAS server and a security domain for installing the CAS information therein.

In accordance with another aspect of the present invention, an operation method of a conditional access system (CAS) server is provided. The operation method includes receiving a CAS installation request including identity information of a broadcast reception device from a broadcast provider server, generating CAS information for the broadcast reception device based on the CAS installation request, receiving a CAS information download request from the broadcast reception device, and transmitting the CAS information to the broadcast reception device.

In accordance with still another aspect of the present invention, a conditional access system (CAS) server is provided. The CAS server includes a communication unit which transmits and receives signals and a controller which controls receiving a CAS installation request including identity information of a broadcast reception device from a broadcast provider server, generating CAS information for the broadcast reception device based on the CAS installation request, receiving a CAS information download request from the broadcast reception device, and transmitting the CAS information to the broadcast reception device.

The technical problems to be solved by the present invention are not restricted to the aforementioned and any other technical problems not mentioned so far will be clearly appreciated from the following description by those skilled in the art.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
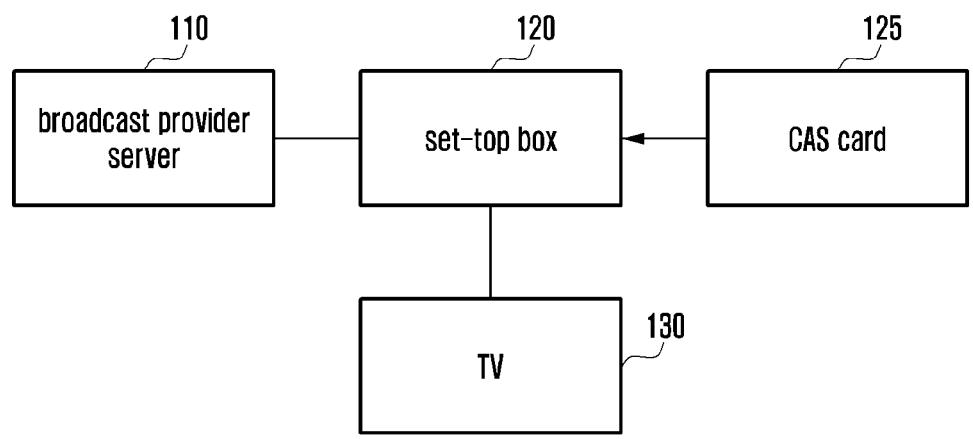
FIG. 1 is a block diagram illustrating an exemplary set-top box-based broadcast reception system.
Figure 2:
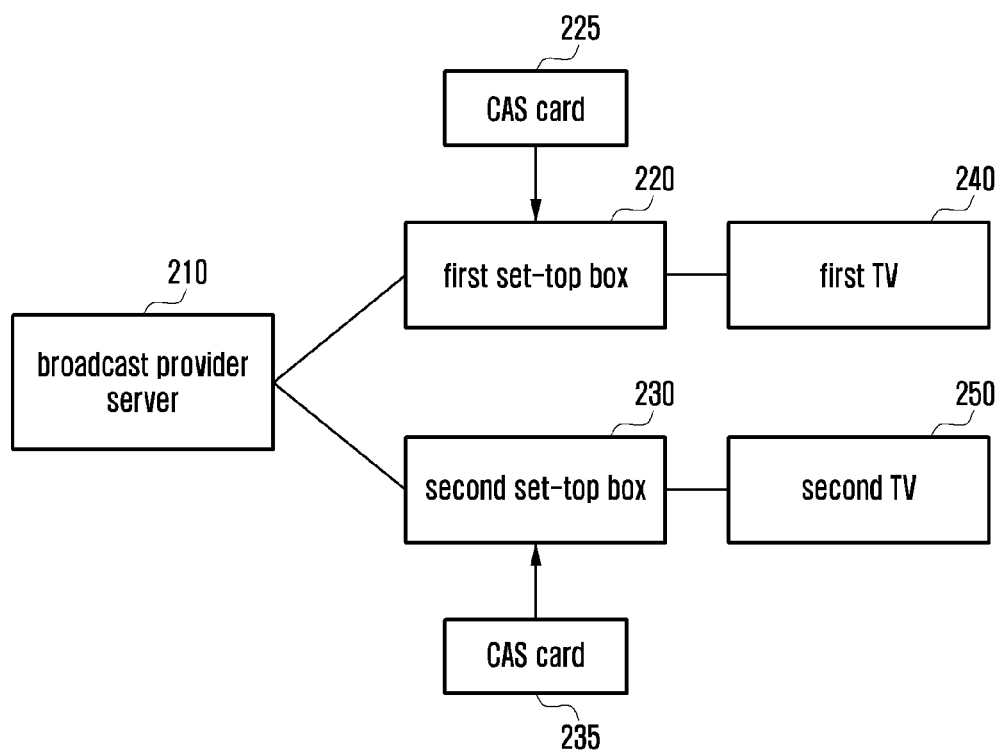
FIG. 2 is a block diagram illustrating another exemplary set-top box-based broadcast reception system.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. The following description is made only of the parts necessary to help understand the operations according to various embodiments of the present invention and is not made of other parts to avoid obscuring the subject matter of the present invention.

The CAS is a restrictive access system for restricting unauthorized users from accessing the channels or services. The CAS allows only authorized subscribers to descramble the scrambled signals broadcast by the broadcasting company and watch the broadcast contents. The CAS is a system designed to descramble the scrambled contents, for a user who has paid for contents with a smart card or a cable card. The CAS system may be understood as a path between a server providing the contents and a client receiving the contents. For example, the CAS makes it possible to differentiate the broadcast services or contents by type and/or quality depending on the payment for the broadcast service or contents.

The CAS may be installed in a set-top box or a recorder of a broadcast reception device (e.g., TV). In an embodiment of the present invention, a device or a CAS device embedded in the set-top box or the broadcast reception device may download and install CAS information.

In an embodiment of the present invention, the CAS information may be downloaded from an external source. The CAS information that can be downloaded may be referred to as downloadable CAS information. The downloadable CAS information is the CAS information that can be downloaded or received from a CAS server rather than the CAS information embedded in a CAS card. In an embodiment of the present invention, the CAS information may be downloaded from a server during a connection to a network. The set-top box or broadcast reception device may have a security device (e.g., security chip) capable of receiving the CAS information and being detachable, and the security device may download the CAS information. The security device may be called a security domain.

In an embodiment of the present invention, it may be possible to receive and manage information of multiple CASs. It may also be possible to replace, modify, and update stored CAS information with downloaded CAS information.

In an embodiment of the present invention, the terms "CAS" and "CAS information" are used interchangeably as an object being downloaded, transmitted, received, and installed. For example, the expressions such as "downloading CAS", "transmitting CAS", "receiving CAS", and "installing CAS" can be interpreted respectively as having the meaning of "downloading CAS information", "transmitting CAS information", "receiving CAS information", and "installing CAS information".

The CAS supports user or subscriber authentication, access control, scrambling/descrambling, and encryption/decryption for a broadcasting service. It may be possible to identify a user; to control access to channels, contents, or services; and to acquire information on the key for descrambling and/or decrypting broadcast information being received from a broadcast provider server. An authorized user may acquire information on the key for use in descrambling and may unscramble the scrambled contents with the assigned key for playback of the contents. The broadcast company can maximize profits by protecting against illegal access to their contents, and the subscriber can enjoy a convenient and error-free service.

Figure 3:
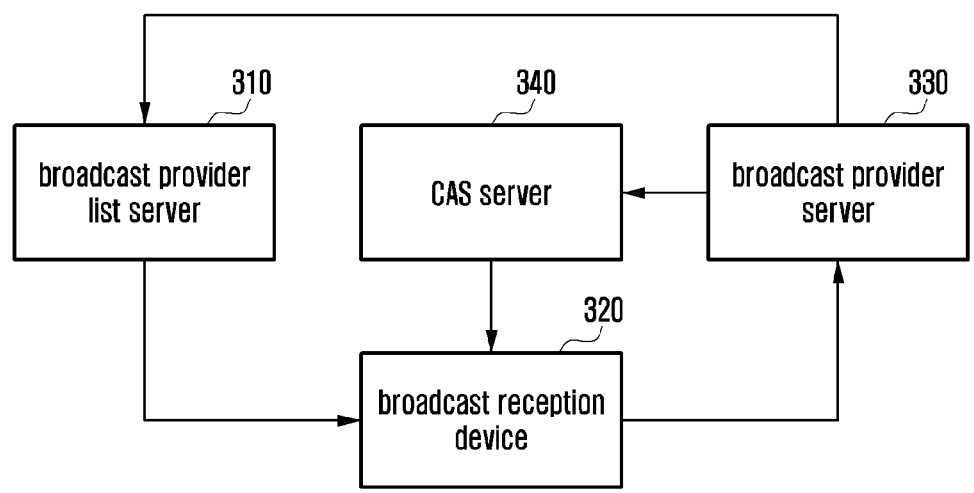
FIG. 3 is a block diagram illustrating a CAS download system according to an embodiment of the present disclosure.

FIG. 3 is a block diagram illustrating a CAS download system according to an embodiment of the present disclosure.

In reference to FIG. 3, the CAS download system includes a broadcast provider list server 310, a broadcast reception device 320, a broadcast provider server 330, and a CAS server 340. At least one of these entities may be omitted or included in any of the other entities.

The broadcast provider list server 310 may provide information on the broadcast providers. The broadcast provider information may include information on the broadcast providers, broadcast provider-specific payment plans or rates, channels available per payment plan, and contents as exemplified in Table 1.

TABLE 1

| Provider | Payment plan | Detail of payment plan |
|---|---|---|
| Provider A | Payment plans A, B, C, etc. | Channel type (a1, a2, a3), channel quality (b1, b2, b3), contents type (c1, c2, c3), etc. |
| Provider B | Payment plans D, E, F, etc. | Channel type (d1, d2, d3), channel quality (e1, e2, e3), contents type (f1, f2, f3), etc. |
| Provider C | Payment plans G, H, I, etc. | Channel type (g1, g2, g3), channel quality (h1, h2, h3), contents type (i1, i2, i3), etc. |
| . . . | . . . | . . . |

The broadcast provider list server 310 may be operated by a TV manufacturer. The broadcast provider information may be installed or input into the TV at the manufacturing stage. It may also be possible for the TV to connect to a network and receive the broadcast provider information from the broadcast provider list server.

The broadcast reception device 320 may be a TV. In an embodiment of the present invention, a TV may download CAS information and display broadcast contents using the CAS. Although this embodiment is directed to a TV as the broadcast reception device 320, the broadcast reception device 320 may be any type of devices capable of receiving broadcast signals with a CAS. The broadcast reception device 320 may acquire broadcast provider information and transmit a subscription request or CAS download request to the broadcast provider server 330 of the broadcast provider selected based on the broadcast provider information. The subscription request may include the CAS download request corresponding to the subscription information. The broadcast reception device 320 may receive the CAS information form the CAS server 340. The broadcast reception device 320 may install the downloaded CAS information and operate the CAS. The broadcast reception device 320 may display the broadcast contents to the subscriber or user using the CAS.

The broadcast provider server 330 may receive the subscription request transmitted by the broadcast reception device 320. The broadcast provider server 330 may transmit a CAS installation request corresponding to the subscription request to the CAS server 340. The CAS installation request may include subscription information and/or identity information. The identity information may include a device identifier of the broadcast reception device 320 and/or an identifier of a security domain of the broadcast reception device 320. The identifier of the security domain may be referred to as a security domain ID. The broadcast provider server 330 may transmit CAS installation notification information to the broadcast provider list server 310. The broadcast provider list server 310 may check for CAS installation in association with the broadcast provider list provided thereby based on the CAS installation notification information and transmit billing information to the corresponding broadcast provider.

The CAS server 340 may receive the CAS installation request transmitted by the broadcast provider server 330 and transmit the CAS information corresponding to the CAS installation request to the broadcast reception device 320. The CAS server 340 may include a CAS information generation server and a CAS information management server. The CAS information generation server and the CAS information management server may be implemented as physically separate entities or a single entity. The operations of the CAS information generation server and CAS information management server to be described hereinafter may be performed by the CAS server 340.

The CAS information generation server may generate the CAS information based on the subscription request. The CAS information generation server may generate the CAS information based on the authentication information (e.g., security domain ID) and/or the subscription information received from the broadcast provider server 330. The CAS information generation server may transmit the CAS information to the CAS information management server. The CAS information generation server may encrypt the CAS information and transmit the encrypted CAS information to the CAS information management server. The CAS information management server is a server for managing the CAS information and transmits the CAS information received from the CAS information generation server to the broadcast reception device 320. The CAS information management server may transit the CAS information to the security domain of the broadcast reception device 320. The CAS information management server may perform the management operation (e.g., CAS activation, deactivation, uninstallation, change, replacement, and update) after the CAS information is installed in the broadcast reception device 320.

Figure 4:
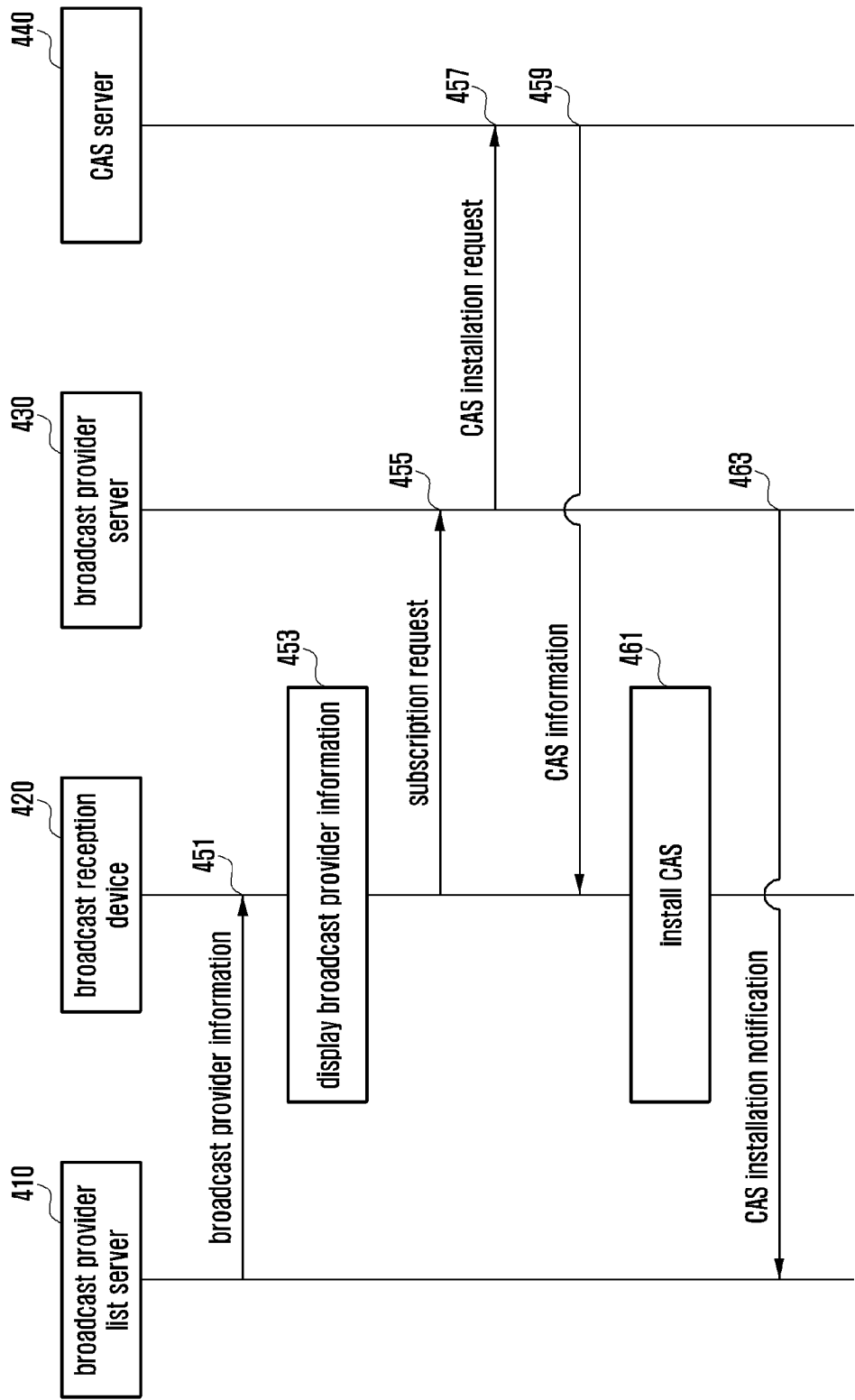
FIG. 4 is a signal flow diagram illustrating a CAS information download procedure according to an embodiment of the present disclosure.

FIG. 4 is a signal flow diagram illustrating a CAS information download procedure according to an embodiment of the present disclosure.

In reference to FIG. 4, a broadcast provider list server 410 may provide a broadcast reception device 420 with broadcast provider information at step 451. The broadcast provider information may include broadcast provider list information. The broadcast provider information may be stored in the broadcast reception device 420 at the manufacturing stage thereof. If the broadcast reception device 420 powers on and connects to a network, it may receive the broadcast provider list information from the broadcast provider list server 410. In this case, the information on the identifier (e.g., server address) of the broadcast provider list server 410 is embedded in the broadcast reception device 420 at the manufacturing stage thereof. Here, the network function of the broadcast reception device 420 may be restricted to acquisition of the broadcast provider information. That is, the broadcast reception device 420 may be designed to preserve a right to access to the broadcast provider list server 410 in the network only for the purpose of acquiring the broadcast provider information. The network access right may be extended to other network functions after acquiring the broadcast provider information. The broadcast provider list server 410 may provide the information on all or part of all broadcast providers. In the case of providing the information on part of all broadcast providers, a filter may be used. For example, it may be possible to use a filter for providing the information on the broadcast providers available in a local area based on the location information of the broadcast reception device 420. The broadcast provider list server 410 may provide the broadcast reception device 420 with information on global (nationwide) broadcast providers regardless of the location of the broadcast reception device 420 and information on local broadcast providers in a location-based manner.

The broadcast reception device 420 may display the broadcast provider information at step 453. For example, the broadcast reception device 420 may display the broadcast provider information on its display. The broadcast provider information may be displayed on a terminal or an electronic device paired with the broadcast reception device 420 as well as the broadcast reception device 420. The user may select a broadcast provider based on the broadcast provider information displayed on the broadcast reception device 420. The user may also select one of the payment plans of the broadcast provider. The channels, quality, and contents of the broadcast service provided by the broadcast provider may be determined depending on the payment plan. The broadcast reception device 420 may display the information on a broadcast provider selection result. The information on the selected broadcast provider and the selected payment plan may be called subscription information. After selecting the broadcast provider, the user may enter subscriber information. The subscriber information may include the information on the personal information and payment information (credit card, account number, etc.) of the subscriber. The subscriber information may be pre-stored and, in this case, the subscriber information input procedure may be omitted. The broadcast provider information may include the addresses of the broadcast provider servers. If the subscriber selects a broadcast provider, the broadcast reception device 420 may transmit a subscription request to the broadcast provider server address of the selected broadcast provider.

The broadcast reception device 420 may transmit the subscription request to the broadcast provider server 430 at step 455. The subscription request may include broadcast subscription information (broadcast provider and/or payment plan selection information). The subscription request may further include information on the subscriber information. The subscription request may include the identity information of the broadcast reception device 420. The identity information of the broadcast reception device may be its own identity information of the broadcast reception device 420 or the identity information of a security domain in which CAS information is downloaded and installed (security domain ID). The broadcast provider server 430 may identify the broadcast reception device 420, selected broadcast provider, selected payment plans, and subscriber; and it may register the subscriber information. The broadcast provider server 430 may check the necessity of installing the CAS corresponding to the selected payment plan for the broadcast reception device 420. If it is determined that there is a necessity to download the CAS information, the procedure goes to step 457. The subscription information received by the broadcast provider server 430 may include the information indicating the necessity of CAS installation. If the information indicating the necessity of CAS installation is included, the broadcast provider server 430 may transmit a CAS installation request to the CAS server 440 at step 457.

At step 457, the broadcast provider server 430 may transmit a CAS installation request to the CAS server 440. The CAS installation request may include at least one of subscription information, a broadcast reception device ID, a security domain ID, and network connection information of the broadcast reception device 420.

At step 459, the CAS server 440 may transmit to the broadcast reception device 420 the CAS information generated based on the CAS installation request received from the broadcast provider server 430. The CAS information may be generated by the CAS information generation server of the CAS server 440. The CAS information generation server may generate the CAS information based on at least one of the subscription information, the broadcast reception device ID, and the security domain ID. It may also be possible to generate the CAS information first and then map the CAS information to at least one of the broadcast reception device ID and the security domain ID. It may be possible to generate the CAS information first and then map the CAS information to at least one of the subscription information, broadcast reception device ID, and security domain ID. This mapping procedure may be performed by the CAS information management server rather than the CAS information generation server. The CAS information generation server may transmit the CAS information to the CAS information management server. The CAS information may be encrypted before being transmitted to the CAS information management server. The CAS information management server may transmit the CAS information to the broadcast reception device 420 in response to the CAS installation request. The network connection information of the broadcast reception device 420 for transmitting the CAS information may be contained in the subscription request transmitted at step 455.

The CAS server 440 may transmit the CAS information to the broadcast reception device 420 in response to a CAS information request from the broadcast reception device 420. The CAS information request may include the broadcast reception device ID or the security domain ID. The CAS information request may include the network connection information of the broadcast reception device 420. The network connection address may include an Internet protocol (IP) address. The CAS server 440 may identify the CAS information addressed to the broadcast reception device 420 by comparing the broadcast reception device ID or security domain ID mapped to the CAS information with the broadcast reception device ID or security domain ID included in the CAS information received from the broadcast reception device.

The broadcast reception device 420 may establish an IP connection with the CAS server 440 to download the CAS information. The broadcast reception device 420 may download the CAS information via a network node connecting the broadcast reception device 420 to the CAS server 440. In the case of downloading the CAS information from the network node, the broadcast reception device 420 may establish a wireless fidelity (Wi-Fi) connection, a Bluetooth connection, or a near field communication (NFC) connection to the network node for downloading the CAS information.

The CAS server 440 may transmit push information to the broadcast reception device 420. The CAS server 440 may transmit the push information to the broadcast reception device 420 based on the network connection information included in the CAS installation request. The push information may be the information indicating the presence of the CAS information to download or asking for consent to download the CAS information. If consent is given to download the CAS information, the CAS server 440 may transmit the CAS information to the broadcast reception device 420.

The broadcast reception device 420 may install the CAS based on the CAS information at step 461. The broadcast reception device 420 may activate the CAS. If multiple CASs are downloaded and installed, the broadcast service may be provided with the activated CAS. The broadcast reception device 420 may unscramble and decrypt the broadcast signals using the activated CAS such that the subscriber receives the broadcast service.

The broadcast provider server 430 may transmit to the broadcast provider list server 410 a CAS installation notification at step 463. The CAS installation notification may be a message for notifying the broadcast provider list server 410 of the CAS download. It may be possible to notify the broadcast provider list server 410 of the CAS installation or CAS download using the CAS installation notification or CAS download notification. The broadcast provider list server 410 may check for the CAS installation or download in association with the broadcast provider list provided thereby based on the broadcast installation notification and transmit billing information to the corresponding broadcast provider. The broadcast provider server 430 may transmit the CAS installation notification or CAS download notification to the broadcast provider list server 410 when a CAS information transmission complete report is received from the CAS server 440 or when a CAS information download complete report or a CAS installation complete report is received from the broadcast reception device 420. The broadcast provider server 430 may also transmit the CAS installation notification or the CAS download notification to the broadcast provider list server 410 when the subscription request or CAS installation request is received from the broadcast reception device 420.

The CAS installation notification may be performed by the broadcast reception device 420 or the CAS server 440 as well as the broadcast provider server 430. The broadcast reception device 420 may transmit the CAS installation notification to the broadcast provider list server 410 after downloading or installing the CAS information. The CAS server 440 may transmit the CAS installation notification to the broadcast provider list server 410 after transmitting the CAS information to the broadcast reception device 420.

As described above, the broadcast reception device 420 may download and install the CAS information based on the broadcast provider information provided by the broadcast provider list server 410 such that the subscriber receives the broadcast service.

Figure 5:
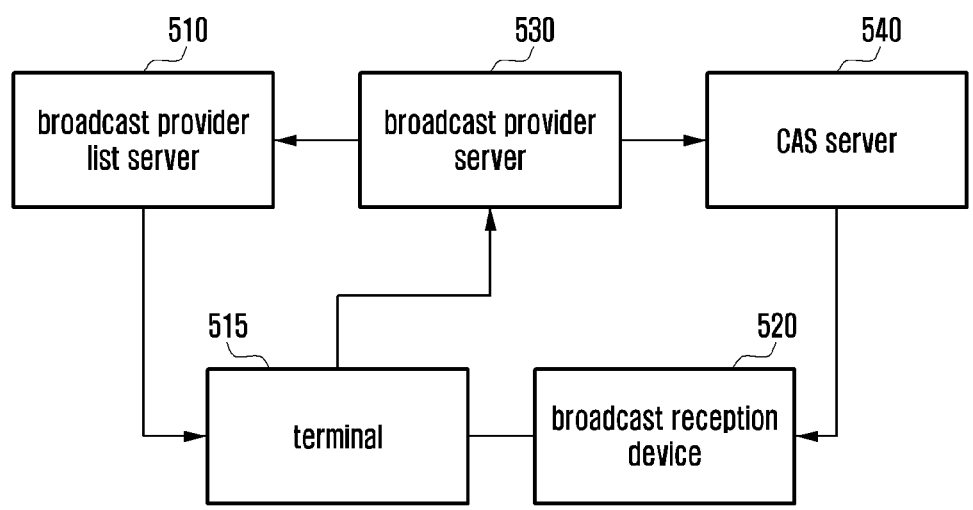
FIG. 5 is a block diagram illustrating a CAS download system according to an embodiment of the present disclosure.

FIG. 5 is a block diagram illustrating a CAS download system according to an embodiment of the present disclosure. In FIG. 5, the entities identical in name with those of FIG. 3 operate in similar manners.

In the embodiment of FIG. 5, the CAS download system may include a broadcast provider list server 510, a terminal 515, a broadcast reception device 520, a broadcast provider server 530, and a CAS server 540. At least one of these entities may be omitted or included in any of the other entities.

Examples of the terminal 515 includes a cellular phone, a radio communication function-enabled smartphone, a radio communication function-enabled Portable Digital Assistant (PDA), a wireless modem, a radio communication function-enabled portable computer, a radio communication function enabled image sensing device such as a digital camera, a radio communication function-enabled gaming device, a radio communication function-enabled music storage and playback appliance, a household appliance capable of wireless Internet access and web browsing, and a portable unit or terminal integrating the functions of the aforementioned items.

The terminal 515 may include an electronic device among the aforementioned devices capable of displaying the broadcast provider information. The terminal 515 may connect to the broadcast reception device 520 to acquire device information from the broadcast reception device 520. For example, the device information may include the broadcast reception device ID or security domain ID.

The broadcast provider list server 510 may provide the terminal 515 with broadcast provider information. The broadcast provider information is identical with that described with reference to FIG. 3. The broadcast provider list server 510 may provide the broadcast provider information based on the location information of the terminal 515 or subscription information of the user of the terminal 515. The broadcast provider list server 510 may provide the terminal 515 with the information on the broadcast providers available at the current location of the terminal 515. The broadcast provider list server 510 may provide the terminal 515 with information on global (nationwide) broadcast providers regardless of the current location of the terminal 515 and information on local broadcast providers in a location-based manner.

The terminal 515 may display the broadcast provider information provided by the broadcast provider list server 510. For example, the broadcast provider information may be displayed as shown in Table 1. The terminal 515 may transmit a subscription request or CAS download request to the broadcast provider server 530 of the broadcast provider selected based on the broadcast provider information. The subscription request may include a CAS download request generated based on the subscription information. The subscription request transmitted by the terminal 515 is associated with the broadcast reception device 520. In this embodiment, the subscription request is transmitted by means of the terminal 515, and the CAS information is received by means of the broadcast reception device 520. Accordingly, the subscription request transmitted by the terminal 515 may include the information on the broadcast reception device along with the subscription information.

The broadcast reception device 520 may download the CAS information from the CAS server 540 based on the subscription request transmitted by the terminal 515. The broadcast reception device 520 may install and manage the CAS based on the CAS information. The broadcast reception device 520 may receive the broadcast service for the subscriber using the CAS.

The broadcast provider server 530 may receive the subscription request from the terminal 515. The broadcast provider server 530 may transmit a CAS installation request to the CAS server 540 upon receipt of the subscription request. The CAS installation request may include the subscription information and/or authentication information of the broadcast reception device. The authentication information may include the security domain ID. The broadcast provider server 530 may transmit a CAS installation notification or CAS download notification to the broadcaster provider list server 510.

Upon receipt of the CAS installation request, the CAS server 540 may transmit the CAS information to the broadcast reception device 520. The CAS server 540 may generate and transmit the CAS information to the broadcast reception device 520 based on the subscription information and/or broadcast reception device ID included in the CAS installation request. The CAS server 540 may include a CAS information generation server and a CAS information management server, which are identical in operation to those described with reference to FIGS. 3 and 4.

Figure 6:
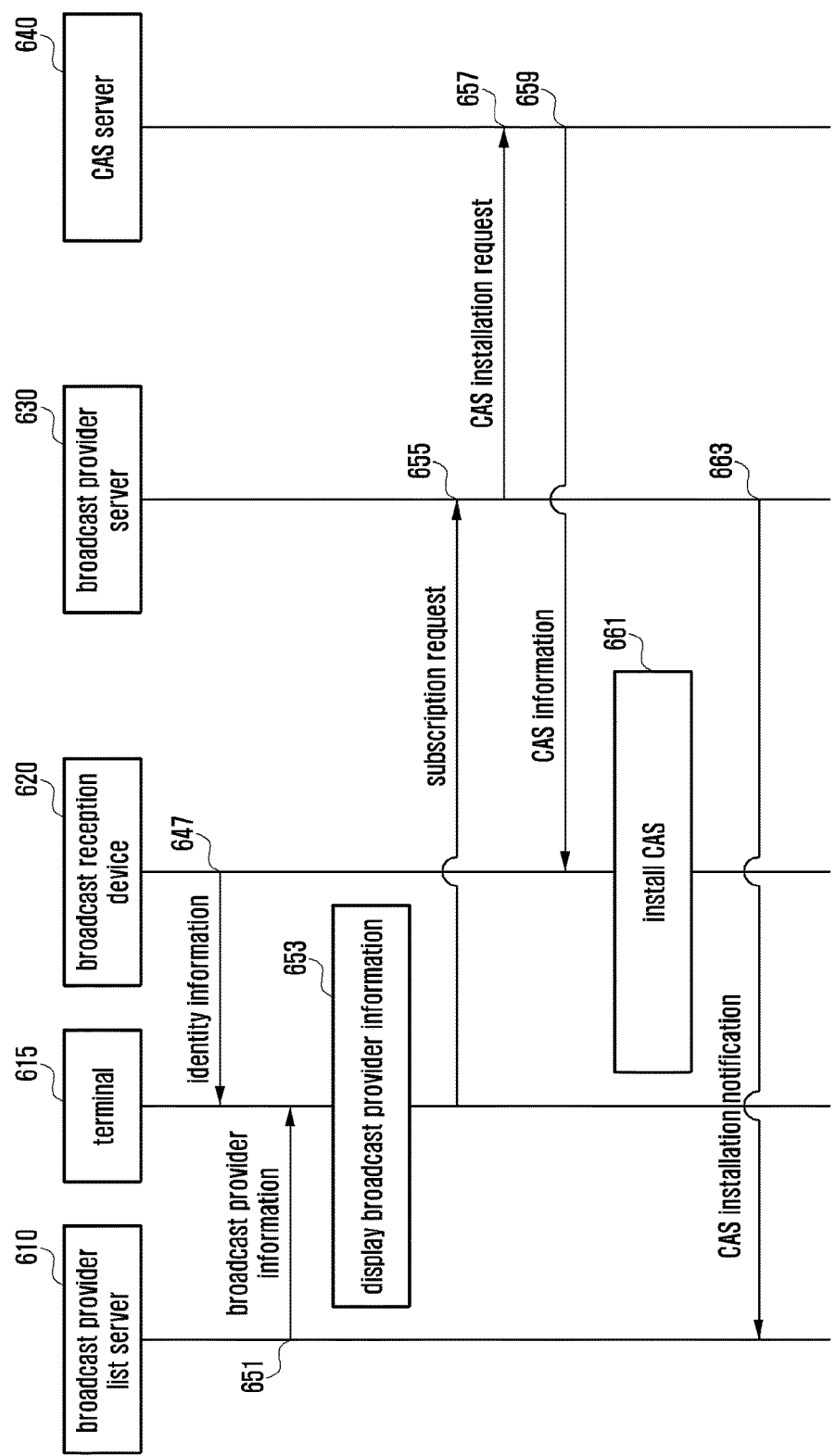
FIG. 6 is a signal flow diagram illustrating a CAS information download procedure according to another embodiment of the present disclosure.

FIG. 6 is a signal flow diagram illustrating a CAS information download procedure according to another embodiment of the present disclosure.

In reference to FIG. 6, a terminal 615 may acquires identity information of a broadcast reception device 620 at step 647. The identity information of the broadcast reception device 620 may include at least one of broadcast reception device ID and security domain ID of the broadcast reception device 620. The terminal 615 may check for network connection information of the broadcast reception device 620. The broadcast reception device 620 may use the network connection information for establishing a connection to a network to download the CAS information from the CAS server 640.

The terminal 615 may acquire broadcast provider information from a broadcast provider list server 610 at step 651. The terminal 615 may request to the broadcast provider list server 610 for the broadcast provider information, and the broadcast provider list server 610 may transmit the broadcast provider information to the terminal 615. The broadcast provider information may be the information on all or part of all broadcast providers. In the case of providing the information on part of all broadcast providers, a filter may be used. For example, it may be possible to use a filter for providing the information on the broadcast providers available in a local area based on the location information of the terminal 615. The broadcast provider list server 610 may provide the terminal 615 with information on global (nationwide) broadcast providers regardless of location and information on local broadcast providers in a location-based manner. The broadcast provider list server 610 may provide the broadcast provider information based on the user information provided by the terminal 615. The user information may include a user's address, age, and gender. The broadcast provider list server 610 may provide the information on the local broadcast providers based on the address of the user. The broadcast provider list server 610 may provide the information on the favorite broadcast provider determined based on statistical analysis of address, age, and gender (with corresponding filters). For example, the broadcast provider list server 610 may provide the broadcast provider information ranking the preferred broadcast providers by region, age, and gender.

The terminal 615 may display the received broadcast provider information at step 653. For example, the terminal 615 may display the broadcast provider information obtained by filtering with the information as exemplified in Table 1 or the user information. The terminal 615 may be paired with the broadcast reception device 620 and, in this case, the broadcast reception device 620 may also display the broadcast provider information.

The user may select a broadcast provider, or a payment plan or service to be provided by a broadcast provider based on the displayed broadcast provider information. The terminal 615 may display the information on the selected broadcast provider or payment plan or service. The user may enter subscriber information after selecting a broadcast provider. The subscriber information may include personal information including payment information (credit card, account number, etc.). The process of entering the subscriber information may be replaced by a process of retrieving previously stored subscriber information. The broadcast provider information may include the information on the addresses of the broadcast provider servers owned by the respective broadcast providers. Accordingly, the user may transmit a subscription request to the server of the broadcast provider selected from the broadcast provider list displayed on the terminal 615.

The terminal 615 may transmit a subscription request to a broadcast provider server 630 at step 655. The subscription request may include broadcast subscription information (selected broadcast provider and/or selected payment plan). The subscription request may also include the identity information of the broadcast reception device 620. The identity information of the broadcast reception device 620 may be a device ID of the broadcast reception device or an ID of a security domain of the broadcast reception device 620 for downloading and installing the CAS information therein.

The broadcast provider server 630 may check for the broadcast reception device 620, the selected broadcast provider, the selected payment plan, and the subscriber information to register the subscription. The broadcast provider server 630 may check for the necessity of installing the CAS corresponding to the selected payment plan in the broadcast reception device 620. If it is determined that there is a need to install the CAS, the procedure goes to step 657.

At step 657, the broadcast provider server 630 may transmit a CAS installation request to a CAS server 640. The CAS installation request may include at least one of subscription information, a broadcast reception device ID, a security domain ID, and network connection information of the broadcast reception device 620.

At step 659, the CAS server 640 may transmit to the broadcast reception device 620 the CAS information generated based on the CAS installation request received from the broadcast provider server 630. The CAS information may be generated by the CAS information generation server of the CAS server 640. The CAS information generation server may generate the CAS information based on at least one of the subscription information, broadcast reception device ID, and security domain ID. It may also be possible to generate the CAS information first and then map the CAS information to at least one of the broadcast reception device ID and the security domain ID. In the case that the CAS information has been generated already, it may be possible to map the previously generated CAS information to at least one of the subscription information, broadcast reception device ID, and security domain ID. This mapping procedure may be performed by a CAS information management server rather than the CAS information generation server. The CAS information generation server may transmit the CAS information to the CAS information management server. The CAS information may be encrypted before being transmitted to the CAS information management server. The CAS information management server may transmit the CAS information to the broadcast reception device 620 in response to the CAS installation request. The network connection information of the broadcast reception device 620 for transmitting the CAS information may be contained in the subscription request transmitted at step 655.

The CAS server 640 may transmit the CAS information to the broadcast reception device 620 in response to a CAS information request from the broadcast reception device 620. The CAS information request may include the broadcast reception device ID or the security domain ID. The CAS information request may include the network connection information of the broadcast reception device 620. The network connection address may include an IP address. The CAS server 640 may identify the CAS information addressed to the broadcast reception device 620 by comparing the broadcast reception device ID or security domain ID mapped to the CAS information with the broadcast reception device ID or security domain ID included in the CAS information received from the broadcast reception device 620. In this case, the CAS information may be generated in response to the subscription request generated by the terminal 615 and transmitted to the broadcast reception device 620 in response to the CAS information download request generated by the broadcast reception device 620.

The CAS server 640 may transmit push information to the terminal 615 or the broadcast reception device 620. The CAS server 640 may transmit the push information to the terminal 615 or the broadcast reception device 620 based on the network connection information included in the CAS installation request. If the terminal 615 or the broadcast reception device 620 consents to download the CAS information, the CAS server 640 may transmit the CAS information to the terminal 615 or the broadcast reception device 620. If the terminal 615 receives the CAS information, it may forward the CAS information to the broadcast reception device 620.

The broadcast reception device 620 may install the CAS based on the CAS information at step 661. The broadcast reception device 620 may activate the CAS. If multiple CASs are downloaded and installed, the broadcast service may be received with the activated CAS. The broadcast reception device 620 may unscramble and decrypt the broadcast signals using the activated CAS such that the subscriber receives the broadcast service.

The broadcast provider server 630 may transmit to the broadcast provider list server 610 a CAS installation notification at step 663. The CAS installation notification may be a message for notifying the broadcast provider list server 610 of the CAS download. It may be possible to notify the broadcast provider list server 610 of the CAS installation or CAS download using the CAS installation notification or CAS download notification. The broadcast provider list server 610 may check for the CAS installation or download in association with the broadcast provider list provided thereby based on the broadcast installation notification and transmit billing information to the corresponding broadcast provider. The broadcast provider server 630 may transmit the CAS installation notification or CAS download notification to the broadcast provider list server 610 when a CAS information transmission complete report is received from the CAS server 640, when a CAS information download complete report or a CAS installation complete report is received from the broadcast reception device 620, or when a CAS information forward complete report is received from the terminal 615.

The CAS installation notification may be performed by the broadcast reception device 620, the CAS server 640, or the terminal 615 as well as the broadcast provider server 630. The broadcast reception device 620 may transmit the CAS installation notification to the broadcast provider list server 610 after downloading or installing the CAS information. The CAS server 640 may transmit the CAS installation notification to the broadcast provider list server 610 after transmitting the CAS information to the broadcast reception device 620. The terminal 615 may transmit the CAS download notification or CAS installation notification when the CAS server 640 transmits the CAS information or when the broadcast reception device 620 downloads the CAS information.

As described above, the terminal 615 may transmit the subscription request for downloading CAS information based on the broadcast provider information provided by the broadcast provider list server 610, and the broadcast reception device 620 may download the CAS information from the CAS server 640 based on a subscription request of the terminal 615 and install the CAS such that the subscriber receives the broadcast service.

Figure 7:
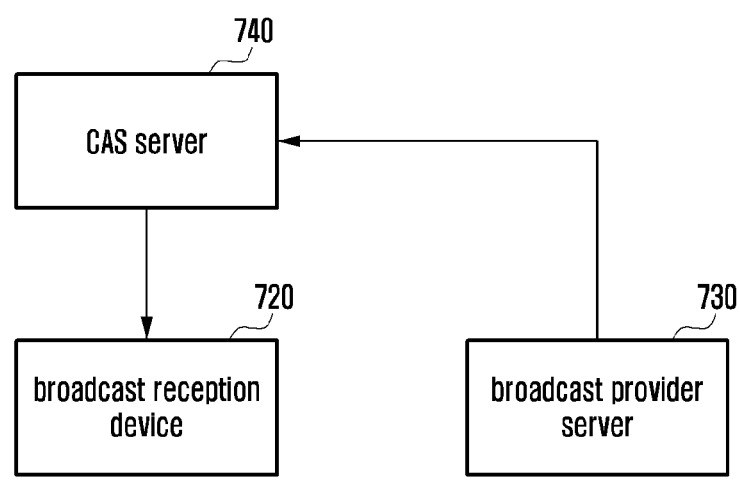
FIG. 7 is a diagram illustrating a CAS download system according to another embodiment of the present disclosure.

FIG. 7 is a diagram illustrating a CAS download system according to another embodiment of the present disclosure. In FIG. 7, the entities identical in name with those of FIG. 3 or 5 operate in similar manners.

In the embodiment of FIG. 7, the CAS download system may include a broadcast reception device 720, a broadcast provider server 730, and a CAS server 740. At least one of the entities may be omitted or included in any of the other entities.

The broadcast provider server 730 may acquire subscription information associated with the broadcast reception device 720. The subscription information may be acquired in various ways. The subscription information may be acquired through a subscription request operation described with reference to FIGS. 3 to 6, an off-line subscription process, or a phone call.

The broadcast provider server 730 may transmit a CAS installation request to the CAS server 740 after acquiring the subscription information. Upon receipt of the CAS installation request, the CAS server 740 may transmit the CAS information to the broadcast reception device 720. The CAS server 740 may generate the CAS information based on the subscription information included in the CAS installation request and/or the identity information of the broadcast reception device 720 and transmit the CAS information to the broadcast reception device 720. The CAS server 740 may receive a CAS information download request from the broadcast reception device 720 and compare the CAS information download request and the CAS installation request to authorize the broadcast reception device 720 to download the CAS information. The CAS server 740 may include a CAS information generation server and a CAS information management server, which are identical in operation to those described with reference to FIGS. 3 to 6.

Figure 8:
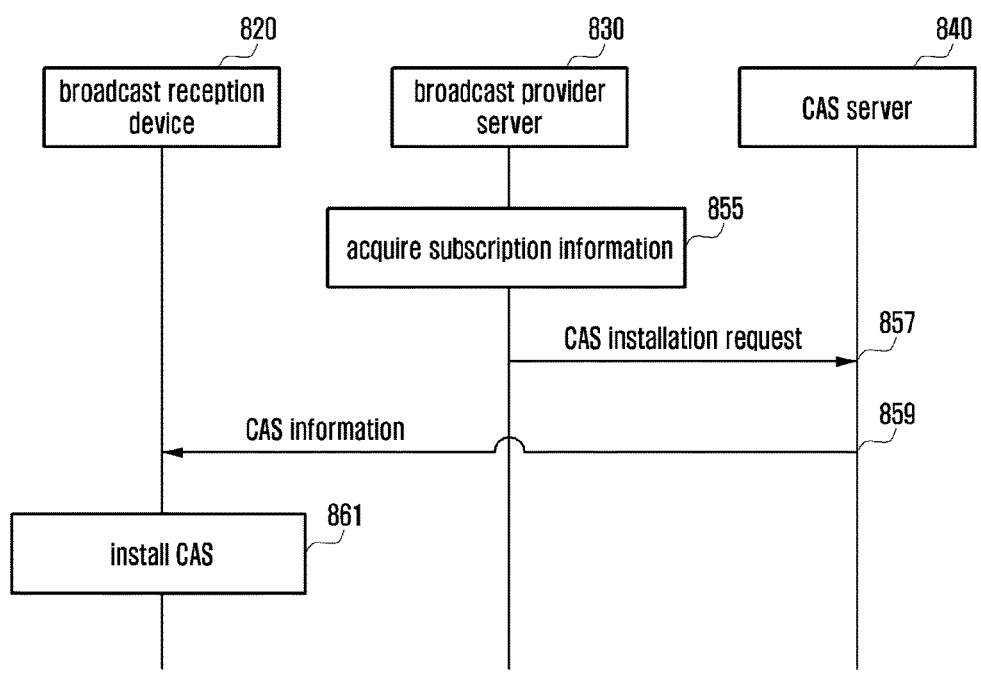
FIG. 8 is a signal flow diagram illustrating a CAS information download procedure according to another embodiment of the present disclosure.

FIG. 8 is a signal flow diagram illustrating a CAS information download procedure according to another embodiment of the present disclosure.

In reference to FIG. 8, the broadcast provider server 830 may acquire subscription information associated with a broadcast reception device 820 at step 855. The subscription information may be acquired in various ways. The subscription information may be acquired through a subscription request operation described with reference to FIGS. 3 to 6, an off-line subscription process, or a phone call. The subscription information may include the information on the selected broadcast operator and/or selected payment plan. The broadcast provider server 830 may acquire identity information of the broadcast reception device 820. The identity information of the broadcast reception device 820 may be its device ID or an ID of its security domain in which the CAS information is downloaded and installed (security domain ID).

The broadcast provider server 830 may identify the broadcast reception device 820, selected broadcast provider, selected payment plans, and subscriber; and it may register the subscriber information. The broadcast provider server 830 may check the necessity of installing the CAS corresponding to the selected payment plan for the broadcast reception device 820. If it is determined that there is a necessity to download the CAS information, the procedure goes to step 857.

At step 857, the broadcast provider server 830 may transmit a CAS installation request to the CAS server 840. The CAS installation request may include at least one of subscription information, a broadcast reception device ID, a security domain ID, and network connection information of the broadcast reception device 820.

At step 859, the CAS server 840 may transmit to the broadcast reception device 820 the CAS information generated based on the CAS installation request received from the broadcast provider server 830. The CAS server 840 may include a CAS information generation server and a CAS information management server, which are identical in operation to those described with reference to FIGS. 4 and 6. The CAS server 840 maps the CAS information to the broadcast reception device ID or security domain ID and manages the mapping. The CAS server 840 may encrypt the CAS information and then transmit the encrypted CAS information to the broadcast reception device 820.

The CAS server 840 may transmit the CAS information to the broadcast reception device 820 in response to a CAS information request from the broadcast reception device 820. The CAS information request may include the broadcast reception device ID or the security domain ID. The CAS information request may include the network connection information of the broadcast reception device 820. The network connection address may include an IP address. The CAS server 840 may identify the CAS information addressed to the broadcast reception device 820 by comparing the broadcast reception device ID or security domain ID mapped to the CAS information with the broadcast reception device ID or security domain ID included in the CAS information received from the broadcast reception device 820.

The broadcast reception device 820 may install the CAS based on the CAS information at step 861. The broadcast reception device 820 may activate the CAS. If multiple CASs are downloaded and installed, the broadcast service may be received with the activated CAS. The broadcast reception device 820 may unscramble and decrypt the broadcast signals using the activated CAS such that the subscriber receives the broadcast service.

In the embodiments of FIGS. 3 to 8, a network node may be interposed between the broadcast reception device and the CAS server. If the broadcast reception device is not directly connected to the CAS server, it may receive the CAS information via the network node. The network node may be a Wi-Fi AP, a handset device, a personal computer, or the like. The broadcast reception device and an IP-based wireless network node may be connected through a layer 2 interface such as Wi-Fi, Bluetooth, NFC, and universal serial bus (USB) cable. In the embodiments of FIGS. 5 and 6, the terminal may operate as the network node. The terminal may receive the CAS information from the CAS server and transmit the CAS information to the broadcast reception device.

In an embodiment of the present invention, the broadcast reception device may have multiple CASs installed therein. In the case that multiple CASs have been installed, the user may activate one of the multiple CASs. If CAS2 is selected while CAS1 has been activated, CAS1 is deactivated and then the CAS2 is activated. If the user wants to receive another broadcast service in the state of using CAS1, it may be necessary to re-acquire the broadcast provider information. The broadcast provider information reacquisition process may be performed in the same way as the broadcast provider information acquisition process as described with reference to FIGS. 3 to 8. If a new broadcast provider and a new payment plan are selected based on the broadcast provider information, it may be possible to download the CAS information supporting the selected broadcast provider and payment plan. The CAS download may be performed as described with reference to FIGS. 3 to 8. If the new CAS information is downloaded, it may be possible to deactivate the old CAS and activate the newly downloaded CAS information according to the user selection. If the old CAS is deactivated, it may be possible to transmit a CAS deactivation notification to the broadcast provider server corresponding to the deactivated CAS.

Figure 9:
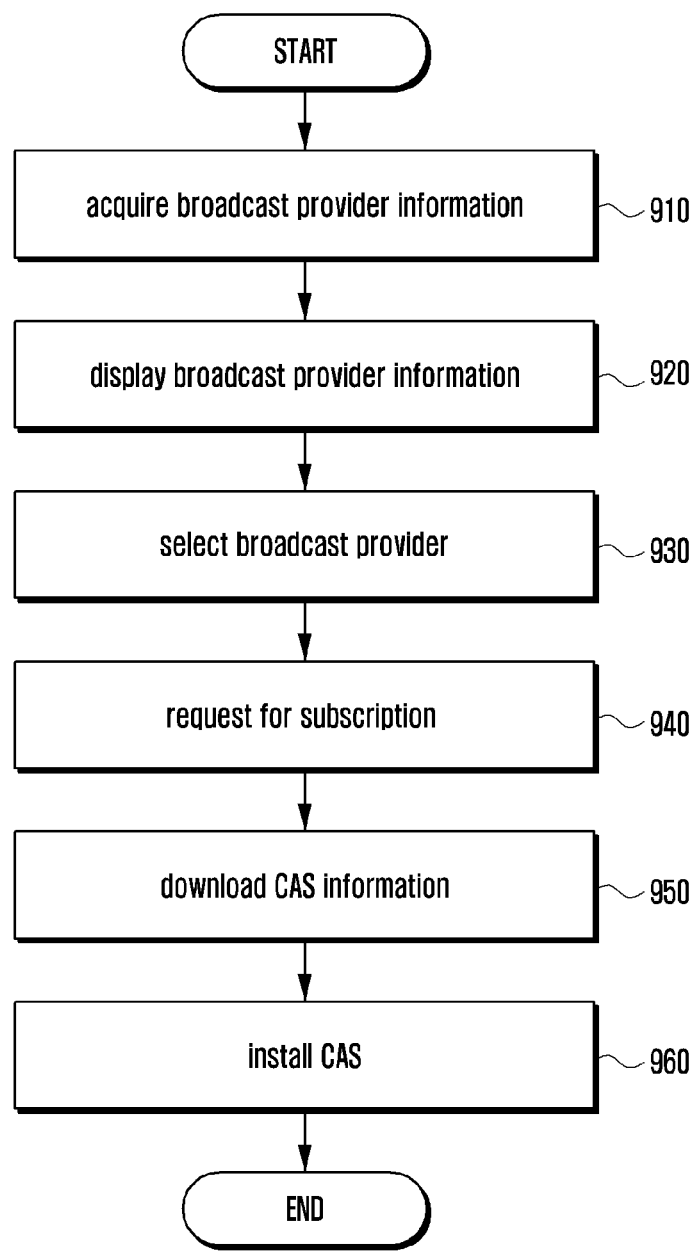
FIG. 9 is a flowchart illustrating an operation of a broadcast reception device according to an embodiment of the present disclosure.

FIG. 9 is a flowchart illustrating an operation of a broadcast reception device according to an embodiment of the present disclosure.

The broadcast reception device may acquire broadcast provider information at step 910. The broadcast provider information may be pre-stored or received from a broadcast provider list server.

The broadcast reception device may display the acquired broadcast provider information at step 920. The broadcast provider information may be display by a terminal paired with the broadcast reception device as well as by the broadcast reception device.

The broadcast reception device may select a broadcast provider at step 930. The broadcast reception device may select one of the broadcast providers listed in the broadcast provider information. The broadcast reception device may also select a broadcast provider along with a payment plan of the broadcast provider. The selection operation may be performed by means of the terminal paired with the broadcast reception device. The broadcast reception device may receive a user input. The broadcast reception device may receive a broadcast provider selection input made by the user. The broadcast reception device may select a broadcast provider based on the broadcast provider selection input.

The broadcast reception device may transmit a subscription request to the broadcast provider server at step 940. The subscription request may be made in association with the selected broadcast provider, payment plan, and service. The subscription request may include subscription information associated with the broadcast provider, payment plan, and service. A broadcast provider server may be selected by the user. The subscription information may include identity information. The identity information may include a broadcast reception device ID and/or a security domain ID of the broadcast reception device. The subscription request may also include network connection information of the broadcast reception device. The broadcast provider server may instruct the CAS server to generate the CAS information and to transmit it to the broadcast reception device according to the subscription request.

The broadcast reception device may receive the CAS information from the CAS server at step 950. The CAS information is received in response to the subscription request transmitted by the broadcast reception device. In order to download the CAS information, an authentication procedure may be performed between the broadcast reception device and the CAS server. In the authentication procedure, the broadcast reception device ID or the security domain ID may be used. After generating the CAS information, the CAS server may transmit the CAS information to the broadcast reception device identified by the network information. The CAS server may perform authentication on the CAS information with the broadcast reception device upon receipt of a CAS information download request from the broadcast reception device and then transmit the CAS information to the broadcast reception device. The broadcast reception device may receive the CAS information from the broadcast server via an additional network node interposed between the broadcast reception device and the CAS server.

The broadcast reception device may install the CAS at step 960 based on the CAS information. The broadcast reception device may activate the installed CAS.

The broadcast reception device may notify a broadcast provider list server of the CAS download or CAS installation.

The operations of the broadcast reception device are not limited to the exemplary embodiment of FIG. 9, and they may include the operations described with reference to FIGS. 3 to 8.

Figure 10:
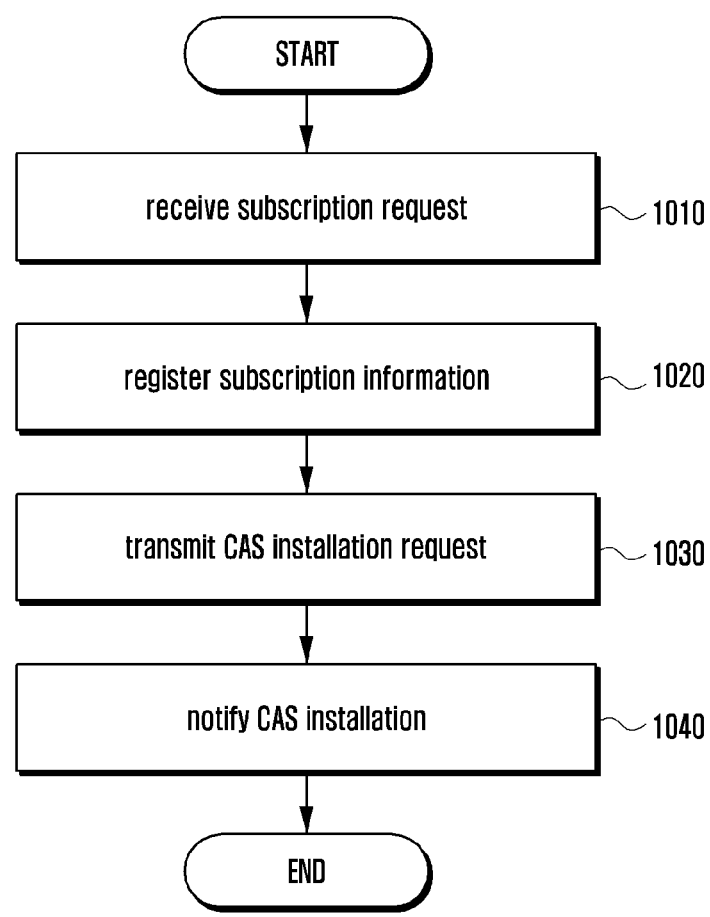
FIG. 10 is a flowchart illustrating an operation of a broadcast provider server according to an embodiment of the present disclosure.

FIG. 10 is a flowchart illustrating an operation of a broadcast provider server according to an embodiment of the present disclosure.

In reference to FIG. 10, a broadcast provider server may receive a subscription request at step 1010. The subscription request may be transmitted by a broadcast reception device or a terminal paired with the broadcast reception device. The subscription request may be in association with a selected broadcast provider, a payment plan, and a service. The subscription request may include subscription information associated with the broadcast provider, payment plan, and service. A broadcast provider server may be selected by the user. The subscription information may include identity information. The identity information may include a broadcast reception device ID and/or a security domain ID of the broadcast reception device. The subscription request may also include network connection information of the broadcast reception device. The broadcast provider server may instruct the CAS server to generate the CAS information and transmit it to the broadcast reception device according to the subscription request.

The broadcast provider server may register the subscription information in association with the broadcast reception device at step 1020. Step 1020 may be omitted.

The broadcast provider server may transmit a CAS installation request to a CAS server at step 1030. The CAS installation request corresponds to the subscription request. The CAS installation request may include the information conveyed by the subscription request. The CAS installation request may instruct at least one of generation of CAS information or transmission of CAS information to the broadcast reception device. The CAS server may transmit the CAS information to the broadcast reception device according to the CAS installation request.

The broadcast provider server may transmit a CAS installation notification to a broadcast provider list server at step 1040. The CAS installation notification may be replaced with CAS download notification. The broadcast provider server may receive a CAS download complete or CAS installation complete message from the CAS server or the broadcast reception device and transmit the CAS installation notification or CAS download notification to the broadcast provider server in reply.

The operations of the broadcast provider server are not limited to the exemplary embodiment of FIG. 10, and they may include the operations described with reference to FIGS. 3 to 8.

Figure 11:
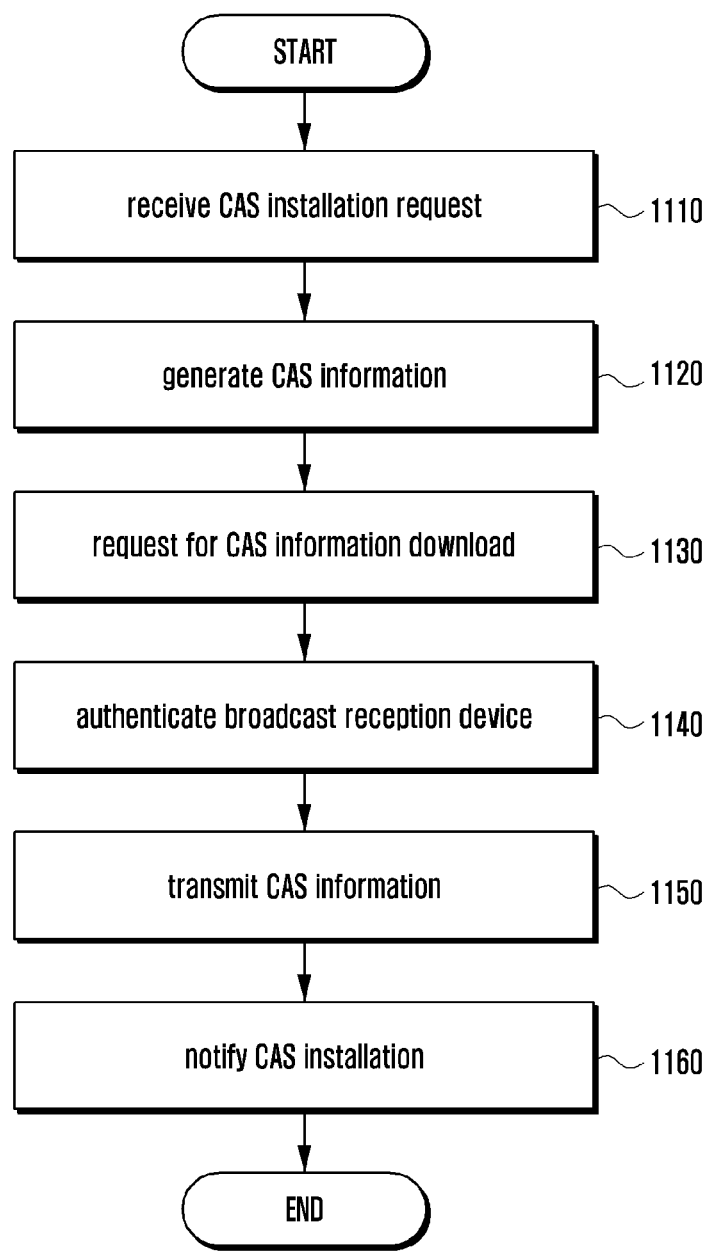
FIG. 11 is a flowchart illustrating an operation of a CAS server according to an embodiment of the present disclosure.

FIG. 11 is a flowchart illustrating an operation of a CAS server according to an embodiment of the present disclosure.

In reference to FIG. 11, the CAS server may receive a CAS installation request from a broadcast provider server at step 1110. The CAS installation request may include subscription information and/or identity information of the broadcast reception device.

The CAS server may generate CAS information according to the CAS installation request at step 1120. In the case of using CAS information generated already, it may be possible to map the CAS information to the information on the broadcast reception device.

The CAS server may receive a CAS information download request from the broadcast reception device at step 1130.

The CAS server may perform authentication on the broadcast reception device that has transmitted the CAS information download request at step 1140. The CAS server may perform authentication on the CAS information generated to the broadcast reception device that has transmitted the CAS information download request. The authentication process may be performed using the identity information (broadcast reception device ID or security domain ID). The CAS server may perform the authentication process using the identity information conveyed by the CAS installation request and the identity information conveyed by the CAS information download request.

Steps 1130 and 1140 may be omitted.

The CAS server may transmit the CAS information to the broadcast reception device at step 1150. If the broadcast reception device is authenticated successfully, the CAS server may transmit the CAS information. The broadcast reception device may receive, install, and activate the CAS information.

The CAS server may notify a broadcast provider list server of the CAS download or CAS installation at step 1160.

The operations of the CAS server are not limited to the exemplary embodiment of FIG. 11, and they may include the operations described with reference to FIGS. 3 to 8

Figure 12:
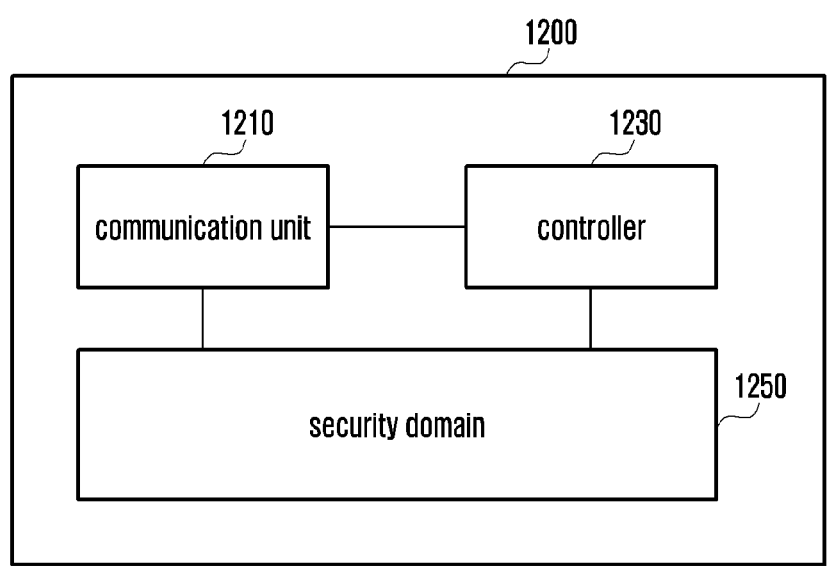
FIG. 12 is a block diagram illustrating a configuration of a broadcast reception device according to an embodiment of the present disclosure.

FIG. 12 is a block diagram illustrating a configuration of a broadcast reception device according to an embodiment of the present disclosure.

In reference to FIG. 12, the broadcast reception device 1200 may include a communication unit 1210, a controller 1230, and a security domain 1250. The security domain 1250 may be embedded within the broadcast reception device 1200 or inserted into the broadcast reception device 1200 in the form of a detachable card.

The communication unit 1210 may transmit and/or receive signals and information and broadcast data to and/or from an external entity. The communication unit 1210 may receive CAS information. The CAS information may be downloaded and installed in the security domain 1250.

The controller 1230 may control the operations of the broadcast reception device 1200. The controller 1230 may control the operations related to broadcast service subscription, CAS information download, CAS installation, and broadcast signal reception.

The controller 1230 may control the broadcast reception device 1200 to acquire broadcast provider information, select one of broadcast providers based on the broadcast provider information, transmit identity information of the broadcast reception device 1200 to a broadcast provider server of the selected broadcast provider, and receive CAS information from a CAS server.

The identity information of the broadcast reception device 1200 may include the identity information of the security domain 1250.

The controller 1230 may control the broadcast reception device 1200 to transmit a CAS information download request including the identity information of the broadcast reception device to the CAS server.

The controller 1230 may control the broadcast reception device 1200 to acquire location-based broadcast provider information based on the location information of the broadcast reception device.

The controller 1230 may control the broadcast reception device 1200 to connect to at least one terminal. In this case, the terminal may perform at least one of the operations of acquiring the broadcast provider information, selecting a broadcast provider based on the broadcast provider information, and transmitting the subscription information including the identity information of the broadcast reception device 1200 to the broadcast provider server of the selected broadcast provider.

The operations of the controller 1230 are not limited to the exemplary embodiment of FIG. 12, and they may include controlling the operations of the broadcast reception device that have been described with reference to FIGS. 3 to 11.

Figure 13:
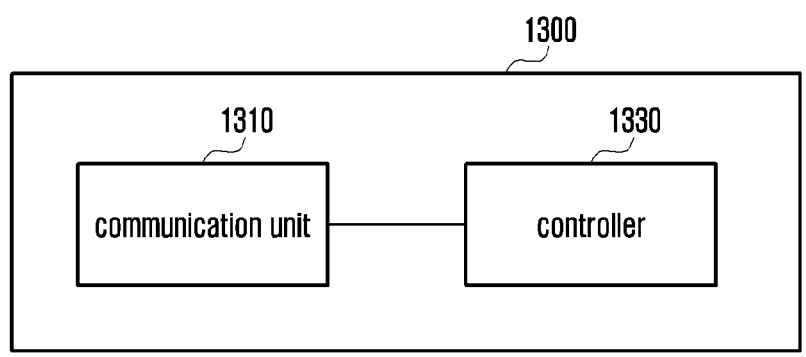
FIG. 13 is a block diagram illustrating a configuration of a broadcast provider server according to an embodiment of the present disclosure.

FIG. 13 is a block diagram illustrating a configuration of a broadcast provider server according to an embodiment of the present disclosure.

In reference to FIG. 13, the broadcast provider server 1300 may include a communication unit 1310 and a controller 1330. The communication unit 1310 may transmit and/or receive signals and information and broadcast data to and/or from an external entity. The broadcast provider server 1300 may receive a subscription request and transmit a CAS installation request by means of the communication unit 1310.

The controller 1330 may control overall operations of the broadcast provider server 1300.

The operations of the controller 1330 are not limited to the exemplary embodiment of FIG. 13, and they may include controlling the operations of the broadcast provider server that have been described with reference to FIGS. 3 to 11.

Figure 14:
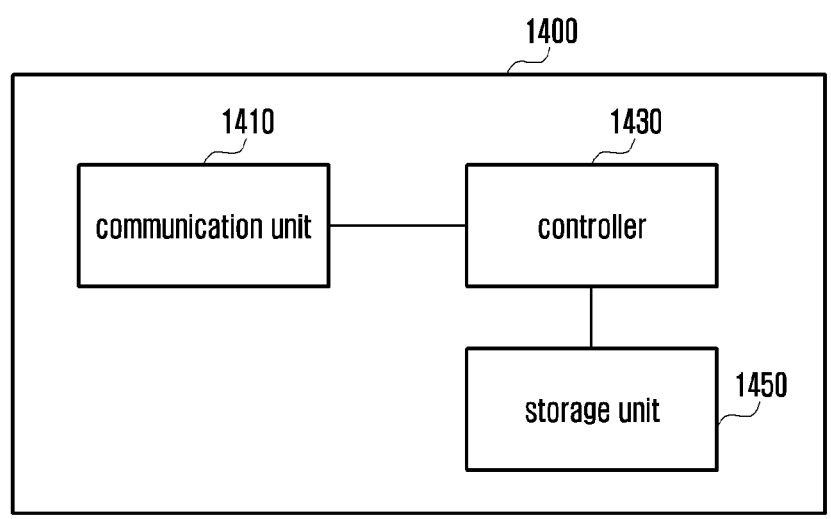
FIG. 14 is a block diagram illustrating a configuration of a broadcast provider list server according to an embodiment of the present disclosure.

FIG. 14 is a block diagram illustrating a configuration of a broadcast provider list server according to an embodiment of the present disclosure.

In reference to FIG. 14, the broadcast provider list server 1400 may include a communication unit 1410, a controller 1430, and a storage unit 1450. The communication unit 1410 may transmit and/or receive signals and information and broadcast data to and/or from an external entity. The broadcast provider list server 1400 may transmit the broadcast provider information by means of the communication unit 1410.

The controller 1430 may control overall operations of the broadcast provider list server 1400.

The storage unit 1450 may store the broadcast provider information.

The operations of the controller 1430 are not limited to the exemplary embodiment of FIG. 14, and they may include controlling the operations of the broadcast provider list server that have been described with reference to FIGS. 3 to 11.

Figure 15:
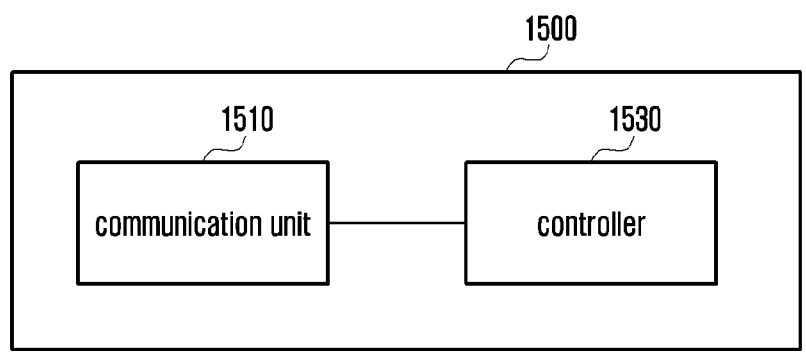
FIG. 15 is a block diagram illustrating a configuration of a CAS server according to an embodiment of the present disclosure.

FIG. 15 is a block diagram illustrating a configuration of a cas server according to an embodiment of the present disclosure.

In reference to FIG. 15, the CAS server may include a communication unit 1510 and a controller 1530. The communication unit 1510 may transmit and/or receive signals and information and broadcast data to and/or from an external entity. The CAS server 1500 may receive a CAS installation request and transmit CAS information by means of the communication unit 1510.

The controller 1530 may control overall operations of the CAS server 1500.

The controller 1530 may control the CAS server 1500 to receive a CAS installation request including identity information of a broadcast reception device from a broadcast provider server, generate CAS information for the broadcast reception device based on the CAS installation request, receive a CAS information download request from the broadcast reception device, and transmit the CAS information to the broadcast reception device.

The controller 1530 may control the CAS server 1500 to perform authentication on the broadcast reception device based on the identity information conveyed by the CAS installation request and the CAS information download request and transmit, when the authentication succeeds, the CAS information to the broadcast reception device.

The controller 1530 may control the CAS server 1500 to transmit a CAS information download notification to a broadcast provider list server.

The operations of the controller 1530 are not limited to the exemplary embodiment of FIG. 15, and they may include controlling the operations of the CAS server that have been described with reference to FIGS. 3 to 11.

As described above, the CAS information download method and apparatus of the present invention is advantageous in terms of facilitating receipt of broadcast signals. Also, the CAS information download method and apparatus of the present invention is advantageous in that a broadcast reception device downloads the CAS information for use in receiving broadcast signals.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for downloading conditional access system (CAS) information by a broadcast reception device, the method comprising:

acquiring, from a broadcast provider list server, broadcast provider information including a list of broadcast providers available to the broadcast reception device and at least one payment plan supported by broadcast providers;

selecting a broadcast provider among the list of broadcast providers and a payment plan of the broadcast provider among the at least one payment plan;

transmitting a subscription request including identity information of the broadcast reception device to a broadcast provider server of the selected broadcast provider, wherein a CAS installation request is transmitted from the broadcast provider server to a CAS server based on the subscription request; and downloading, from the CAS server, CAS information generated based on the CAS installation request, the CAS information including key information for broadcast information to be received from the broadcast provider server, wherein the at least one payment plan is associated with at least one of a channel type, a channel quality, and a content type.

2. The method of claim 1, wherein the identity information of the broadcast reception device comprises identity information of a security domain where the CAS information is downloaded and installed.

3. The method of claim 1, further comprising transmitting a CAS information download request including the identity information of the broadcast reception device to the CAS server.

4. The method of claim 1, wherein the list of broadcast providers are sorted based on location information of the broadcast reception device, and
wherein the subscription request includes information on the selected payment plan supported by the selected broadcast provider.

5. The method of claim 1, further comprising connecting to at least one terminal, that performs at least one of acquiring the broadcast provider information, selecting the broadcast provider based on the broadcast provider information, or transmitting the subscription request including identity information of the broadcast reception device to the broadcast provider server of the selected broadcast provider.

6. A broadcast reception device, comprising:
a transceiver;
a security domain; and
a controller configured to:
acquire, via the transceiver from a broadcast provider list server, broadcast provider information including a list of broadcast providers available to the broadcast reception device and at least one payment plan supported by broadcast providers,
select a broadcast provider among the list of broadcast providers and a payment plan of the broadcast provider among the at least one payment plan,
transmit, via the transceiver, a subscription request including identity information of the broadcast reception device to a broadcast provider server of the selected broadcast provider, wherein a CAS installation request is transmitted from the broadcast provider server to a CAS server based on the subscription request,
download, from the CAS server via the transceiver, CAS information generated based on the CAS installation request, the CAS information including key information for broadcast information to be received from the broadcast provider server, and
install the CAS information on the security domain,
wherein the at least one payment plan is associated with at least one of a channel type, a channel quality, and a content type.

7. The broadcast reception device of claim 6, wherein the identity information of the broadcast reception device comprises identity information of the security domain.

8. The broadcast reception device of claim 6, wherein the controller is further configured to transmit a CAS information download request including the identity information of the broadcast reception device to the CAS server.

9. The broadcast reception device of claim 6, wherein the list of broadcast providers are sorted based on location information of the broadcast reception device, and
wherein the subscription request includes information on the selected payment plan supported by the selected broadcast provider.

10. The broadcast reception device of claim 6, wherein the controller is further configured to connect to at least one terminal, that performs at least one of acquiring the broadcast provider information, selecting the broadcast provider based on the broadcast provider information, or transmitting the subscription request including identity information of the broadcast reception device to the broadcast provider server of the selected broadcast provider.

11. A method by a conditional access system (CAS) server, the method comprising:
receiving a CAS installation request based on a subscription request of a broadcast reception device from a broadcast provider server that is selected by the broadcast reception device based on broadcast provider information including a list of broadcast providers that is provided by a broadcast provider list server and available to the broadcast reception device;
generating CAS information for the broadcast reception device based on the CAS installation request;
receiving a CAS information download request from the broadcast reception device; and
transmitting, to the broadcast reception device, the CAS information including key information for broadcast information to be received from the broadcast provider server,
wherein the broadcast provider information further includes at least one payment plan supported by broadcast providers,
wherein a broadcast provider of the broadcast provider server is selected among the list of broadcast providers and a payment plan of the broadcast provider is selected among the at least one payment plan, and
wherein the at least one payment plan is associated with at least one of a channel type, a channel quality, and a content type.

12. The method of claim 11, further comprising authenticating the broadcast reception device based on an identity information included in the CAS installation request and the CAS information download request, the CAS information being transmitted to the broadcast reception device when the broadcast reception device is successfully authenticated.

13. The method of claim 11, further comprising transmitting a CAS information download notification to the broadcast provider list server.

14. A conditional access system (CAS) server, comprising:
a transceiver; and
a controller configured to:
receive, via the transceiver, a CAS installation request based on a subscription request of a broadcast reception device from a broadcast provider server that is selected by the broadcast reception device based on broadcast provider information including a list of broadcast providers that is provided by a broadcast provider list server and available to the broadcast reception device,
generate CAS information for the broadcast reception device based on the CAS installation request,
receive, via the transceiver, a CAS information download request from the broadcast reception device, and
transmit, to the broadcast reception device via the transceiver, the CAS information including key information for broadcast information to be received from the broadcast provider server,
wherein the broadcast provider information further includes at least one payment plan supported by broadcast providers,
wherein a broadcast provider of the broadcast provider server is selected among the list of broadcast providers and a payment plan of the broadcast provider is selected among the at least one payment plan, and
wherein the at least one payment plan is associated with at least one of a channel type, a channel quality, and a content type.

15. The CAS server of claim 14, wherein the controller is further configured to authenticate the broadcast reception device based on an identity information included in the CAS installation request and the CAS information download request and transmitting the CAS information to the broadcast reception device when the broadcast reception device is successfully authenticated.

16. The CAS server of claim 14, wherein the controller is further configured to transmit a CAS information download notification to a broadcast provider list server.

17. The method of claim 11, wherein the CAS installation request comprises the subscription request, and
    wherein the subscription request includes information on the selected payment plan supported by the selected broadcast provider.

18. The method of claim 11, wherein generating the CAS information comprises:
    encrypting the CAS information; and
    transmitting the encrypted CAS information to a security domain of the broadcast reception device.

19. The CAS server of claim 14, wherein the CAS installation request comprises the subscription request, and
    wherein the subscription request includes information on the selected payment plan supported by the selected broadcast provider.

20. The CAS server of claim 14, wherein at least one processor is further configured to:
    encrypt the CAS information, and
    transmit the encrypted CAS information to a security domain of the broadcast reception device.

\* \* \* \* \*